(12) United States Patent
Bhaskar et al.

(10) Patent No.: US 8,625,775 B2
(45) Date of Patent: Jan. 7, 2014

(54) METHOD AND SYSTEM FOR REDUCING ECHO AND NOISE IN A VEHICLE PASSENGER COMPARTMENT ENVIRONMENT

(75) Inventors: Udaya Bhaskar, Germantown, MD (US); Peng Lee, Rockville, MD (US)

(73) Assignee: HTI IP, L.L.C., Atlanta, GA (US)

( * ) Notice: Subject to any disclaimer, the term of this patent is extended or adjusted under 35 U.S.C. 154(b) by 729 days.

(21) Appl. No.: 12/852,341

(22) Filed: Aug. 6, 2010

(65) Prior Publication Data

US 2011/0033059 A1 Feb. 10, 2011

Related U.S. Application Data

(60) Provisional application No. 61/231,834, filed on Aug. 6, 2009.

(51) Int. Cl.
*H04M 9/08* (2006.01)
*G10K 11/16* (2006.01)
*A61F 11/06* (2006.01)

(52) U.S. Cl.
USPC ............ 379/406.01; 379/406.08; 379/406.13; 379/406.12; 379/406.06; 381/71.4; 381/71.11; 381/71.12

(58) Field of Classification Search
USPC ............ 379/406.01–406.16; 381/71.4, 71.11, 381/71.12
See application file for complete search history.

(56) References Cited

U.S. PATENT DOCUMENTS

| 6,798,754 | B1 * | 9/2004 | Farhang-Boroujeny | 370/286 |
| 7,764,783 | B1 * | 7/2010 | Pai et al. | 379/406.08 |
| 2007/0121925 | A1 * | 5/2007 | Cruz-Zeno et al. | 379/406.01 |

* cited by examiner

*Primary Examiner* — Duc Nguyen
*Assistant Examiner* — Sonia Gay
(74) *Attorney, Agent, or Firm* — John L. Doughty (57) ABSTRACT

An echo cancelling algorithm in a communication device initializes a step size value used in an adaptive echo filter based on a background noise signal power level relative to a power level of a received signal and a power level of an echo estimate relative to an output of an echo canceller. The algorithm then adjusts the step size value. One aspect adjusts the step size based on the detection of large fast fourier transform values at one, or more, disturbing-signal frequencies. Another aspect estimates residual echo energy to adjust an estimated echo energy, which then is used to set a double talk flag if a transmit signal has much more power than the estimated echo signal. Another aspect compares transmit signal power to a decimated version of the transmit signal power and sets the double talk flag if the former exceeds the latter by a predetermined amount.

9 Claims, 5 Drawing Sheets

METHOD AND SYSTEM FOR REDUCING ECHO AND NOISE IN A VEHICLE PASSENGER COMPARTMENT ENVIRONMENT

CROSS REFERENCE TO RELATED APPLICATIONS

This application claims priority under 35 USC sec. 119 to U.S. Provisional Patent Applications 61/231,834 having a filing dates of Aug. 6, 2009, which this application incorporates herein by reference in its entirety.

FIELD

The invention relates to adaptive echo cancellation and noise reduction, and more particularly to a cancelling echo and reducing noise in a vehicle passenger cabin.

DETAILED DESCRIPTION

As a preliminary matter, it will be readily understood by those persons skilled in the art that the present aspects are susceptible of broad utility and application. Many methods, embodiments, aspects, and adaptations other than those herein described, as well as many variations, modifications, and equivalent arrangements, will be apparent from or reasonably suggested without departing from the substance or scope described herein.

Accordingly, while a detailed description in relation to preferred embodiments has been given, it is to be understood that this disclosure is only illustrative and exemplary and is made merely for the purposes of providing a full and enabling disclosure. The following disclosure is not intended nor is to be construed to limit or to exclude other embodiments, adaptations, variations, modifications and equivalent arrangements, the present invention being limited only by the claims appended hereto and the equivalents thereof.

Figure 1:
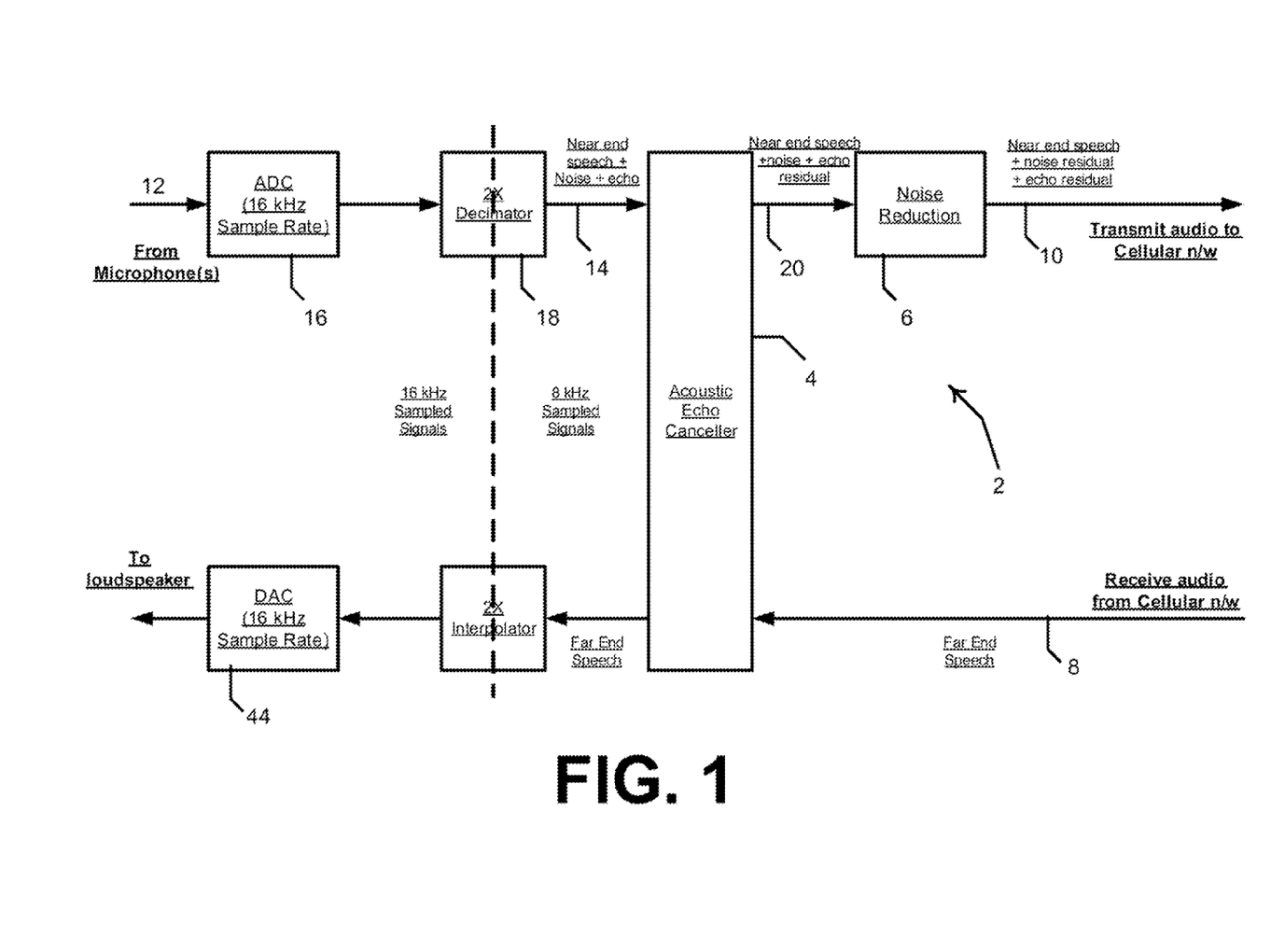
FIG. 1 illustrates a block diagram of an adaptive echo cancellation and noise reducing audio processing system.

FIG. 1 illustrates a high level block diagram of an adaptive echo cancellation ("AEC") and noise reduction ("NR") system 2 and the location of the NEC module 4 and NR module 6 in relation to a receive signal 8 and a conditioned transmit signal 10. Conditioned transmit signal 10 is typically a combination of processed versions of the following signals: speech from a near end talker in the car, which is the desired signal; echo of the far end talker's signal acoustically coupled from a loudspeaker to the microphone via a direct path as well as reflections within the vehicle cabin, the echo being an undesired signal; and ambient background noise due to road noise, wind noise, engine noise, etc., which is also an undesired signal. At various stages of processing, microphone signals 12 may be processed into: a downconverted transmit signal 14 that includes the same signals converted from mechanical energy to electrical energy by a microphone, converted to a digital signal by an analog to digital convertor ("A/D") 16 and then downconverted, typically by a 2× decimator 18. After processing by AEC 4, the echo cancelled transmit signal 20 includes the desired near end speech, background noise, and residual echo signal energy, which ideally would be zero. After applying noise reduction by noise reduction module 6, conditioned transmit signal 10 hopefully includes a strong near end speech signal, and relatively weak noise residue and echo residue signals.

The AEC module 4 cancels undesirable echo that would otherwise be present in the transmit signal using the receive, signal 8 as a reference signal. The echo cancellation task becomes challenging when both near end and far end talkers are simultaneously active, which is a condition known as double talk—the condition where only one talker is active at a time is referred to as single talk. Under double talk conditions, cancelling echo of the far end talker's voice without distorting the near end talker signal enhances full duplex conversation.

The presence of high levels of background noise presents a challenging condition for AEC performance and double talk detection. The function of the NR module 6 is to reduce, or suppress, the level of the ambient background noise component in the transmit signal 10, with minimal distortion to the near end user's voice signal being transmitted to the far end user. Further, any residual background noise should be mostly free of artifacts and should not subjectively annoy the far end user.

Figure 2:
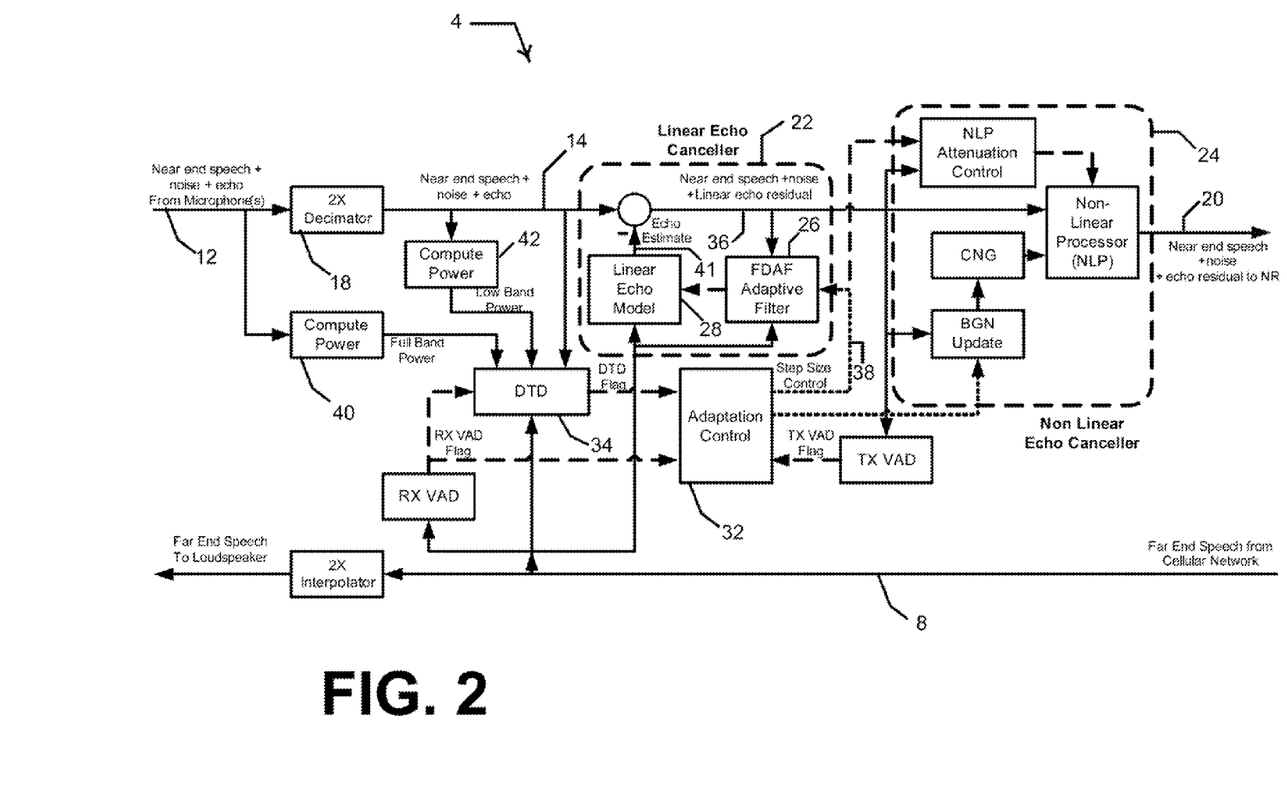
FIG. 2 Illustrates a block diagram of an adaptive echo cancellation system.

Turning now to FIG. 2, the figure shows a high level block diagram of the AEC system 4, including linear echo canceller 22 (linear echo model) and nonlinear echo suppressor ("NLP") 24. The AEC uses a frequency domain adaptive filtering ("FDAF") algorithm 26 for adapting the linear echo canceller model 28 to represent the acoustic transfer function between the loudspeaker and the microphone. The echo cancelled signal 20 is sent to the noise reduction module 6. The following description describes techniques for enhancing and improving features, functionality, and performance of an FDAF in the presence of high levels of background noise, double talk, and echo path variation, which are all typical of a vehicle passenger compartment environment.

The AEC adaptation algorithm 4 continuously updates the parameters of an echo model 28 based on the receive signal 8 and the echo cancelled transmit signal 20. The rate of adaptation is controlled by a scalar step size parameter controlled by adaption control module 32. The step size has to be selected carefully to balance the conflicting requirements of convergence speed (to rapidly converge initially and in case of echo path variations) and the ability to track small fluctuations in the echo path after convergence. In addition, under double talk conditions, the step size is reduced or set to zero, effectively freezing the adaptation, to prevent the algorithm from diverging. Since the near end talker signal can act as a disturbance during double talk, freezing adaptation reduces the effects of occurrences that would otherwise mislead the adaptation process. Usually, a double talk detector ("DTD") 34 detects the double talk condition and sends a DTD flag to adaptation control module 32 to freeze adaptation. However, practical DTD algorithms cannot detect double talk perfectly or instantaneously and some adaptation may occur under double talk conditions, deteriorating the performance of the AEC.

Adaptation control is by (a) the product of the fast fourier transform ("FFT") vectors of receive signal 8 and echo canceller output signal 36 and (b) fixed scalar step size parameter 38 from adaption control algorithm module 32. Even if the FFT product is small for most frequencies (hence small when averaged across the vector), large perturbations to the echo model 28 can occur even if the FFT product vector has unusually large values at a few isolated frequencies. After echo canceller 22 has reached convergence, large perturbations are indicative of (a) double talk, (b) high noise levels, or (c) abrupt echo path change. Of these causes, abrupt echo path change is least likely to generate a large perturbation. Large perturbations at isolated frequencies are used by an adaptation control module to control the adaptation step size, so that convergence is better maintained in the presence of above disturbances.

To determine an initial step size value sent from the adaption control module 32 via control path 38 to FDAF module 26, the adaption control module may use values for relative power of receive signal 8, transmit input signal (using full band power compute block 40 for signal 12 or half band power computer block for signal 14), echo canceller output signal 36, echo estimate signal 41, and/or estimated background noise power level. In an aspect, the method for determining the initial step size value can be determined as summarized by the following step s that may be repeated for every short sample period, or frame, of N samples, where N is typically 128-512 samples/frame, after the initial convergence period, typically 2 seconds.

If background noise power is significant compared to the receive signal power 8, reducing the adaptation rate helps avoid divergence, since otherwise noise drives the adaptation. Reduction may be achieved according to the following condition statements: if receive signal power<=3 dB+background noise power level, the step size is reduced by a factor of 0.01; if receive power>10 dB+background noise power level, no reductions in step size; if receive power is between 3 and 10 dB, step size is linearly reduced.

Another evaluation determines if power of the echo estimate is significant compared to output of the echo canceller, which could indicate that the echo canceller input contains signals other than echo. In this case, reducing the adaptation also rate helps avoid divergence that double talk or noise might otherwise cause. This is achieved by the following: if echo estimate power<=echo canceller output power, step size is reduced by a factor of 0.01; if echo estimate power>12 dB+echo canceller output power, no reductions in step size; if the echo estimate signal power falls between 0 and 12 dB, step size is linearly increased.

In addition to using relative power levels to initialize the step size, frequency vectors can be used to refine the step size value based on the observation that a disturbing signal (double talk and/or noise) may cause large FFT values at some specific frequencies. This can cause the echo model to diverge at these frequencies. Step size control based on average powers, as described above, does not exploit this frequency specific information since it the averaging aspect of the power computations obscure the power contributions at different frequencies. Using the powers at different frequencies enhances the adjustment of the step size by detecting the occurrence of large values at different frequencies, as summarized here:

1. In each short term frame, compute the FFT product vector of receive and echo canceller output signals; compute the log-magnitude FFT vector.
2. Use the above short term log-magnitude FFT vector to update a long term time averaged log-magnitude FFT product vector. The long term averaging period is typically 2 sec.
3. Compute the deviation between short term and long term average magnitude FFT vectors. Limit the computation to frequencies in the telephony band, i.e., 200 Hz-3200 Hz.
4. Average the deviations across all frequencies where the short term vector exceeds the long term vector.
5. If the average deviation exceeds a predetermined threshold (3 dB typical), reduce the adaptation step-size. As deviation increases, step size decreases proportionately.
6. Also compute the peak deviation across the telephony band
7. If the peak deviation exceeds a threshold (6 dB typical) further reduce the step size in proportion to the peak deviation.

Figure 4:
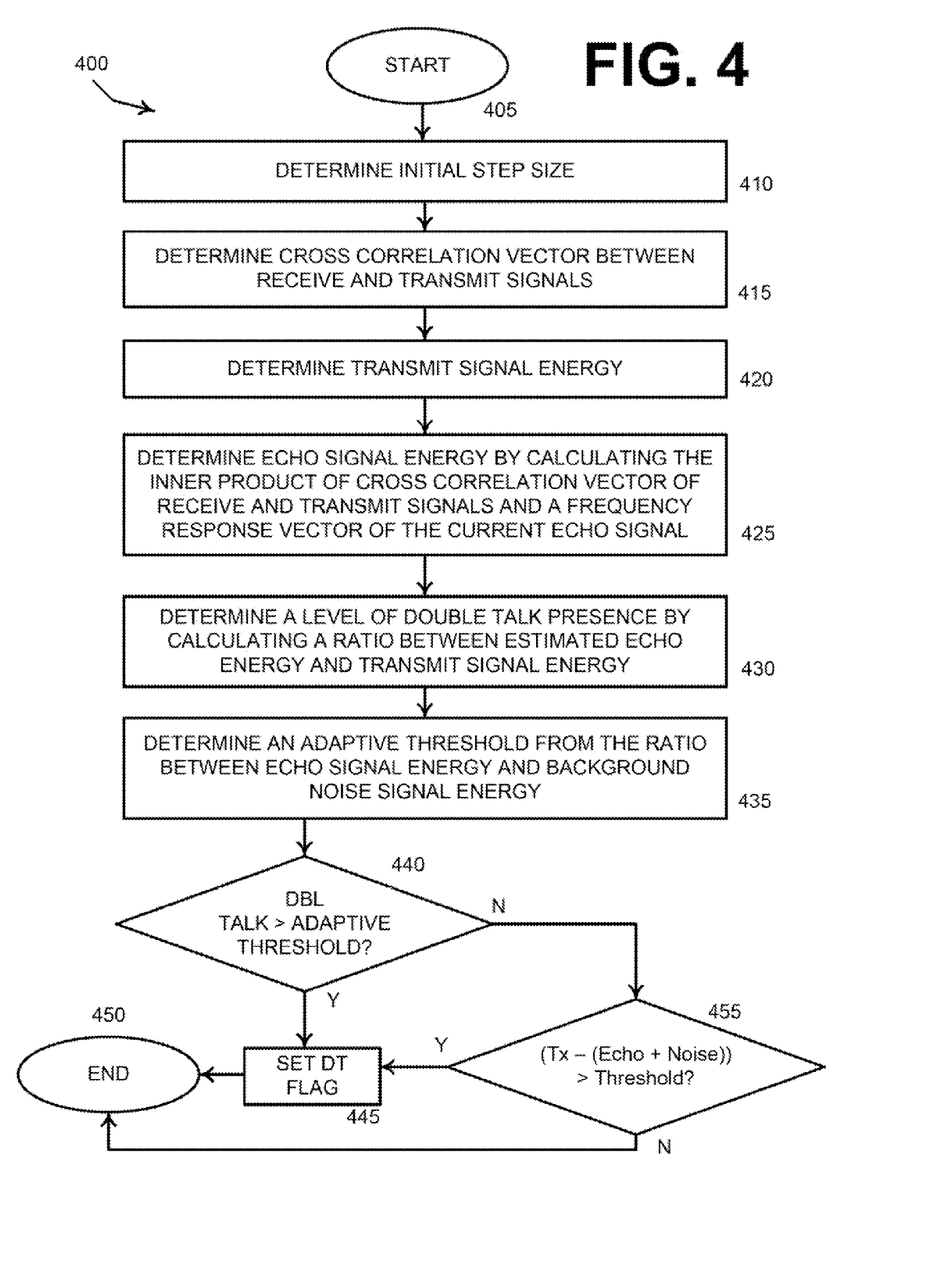
FIG. 4 illustrates a flow diagram of a method for maintaining convergence under double talk and background noise conditions.

Turning now to FIG. 4, the figure illustrates a flow diagram of a method 400 for reducing echo and noise using an algorithm running on a communication device. Method 400 begins at step 405, and at step 410, the method determines an initial step size based on a background noise signal power level relative to a power level of a received signal 8 and a power level of an echo estimate 26 relative to an output of an echo canceller 4. At step 415, the algorithm determines a cross correlation vector between a receive signal 8 and transmit signal 12 (or 14)—the cross correlation result will have higher values where the transmit signal and the receive signal contain similar energy levels at given frequencies, such as far-end user voice signals and echo thereof. At step 420 the algorithm determines transmit signal energy and at 425 determines echo signal energy.

The algorithm determines echo signal energy by calculating the inner product of the cross correlation vector from step 415 and a frequency response vector of the current echo signal. The value of the resultant will be higher the more the cross correlation vector and the frequency response of the echo signal have maximums at the same frequencies.

At step 430, the algorithm determines a level of double talk by calculating a ratio between the estimated echo energy from step 425 and the transmit signal 12 (or 14) as shown in FIG. 2. At step 435, the algorithm determines an adaptive threshold value from the ration from step 430.

At step 440, the algorithm determines whether the double talk level ratio from step 430 exceeds the adaptive threshold. If yes, the algorithm sets a double talk detection flag at step 445 and ends at step 450.

If the determination at step 440 is no, the algorithm advances to step 455 where it determines whether transmit energy minus the energy of the echo of the far end user's signal coupled from a speaker to a microphone and noise from the near user's environment, such as, for example, the passenger compartment of an automobile, exceeds a threshold. In simplified terms, the transmit energy minus the echo energy and the far end user's signal (typically the receive signal) is the residual echo signal power—a residual echo signal results when an adaptive echo model does not perfectly model the actual echo and thus does not completely cancel the echo in a given environment. The threshold used in step 455 is typically predetermined, and may be referred as a single-to-double-talk-state transition threshold that when the transmit energy minus the residual echo energy exceeds it, the algorithm sets the double talk flag at step 445 and then ends at step 450. In an aspect, the single-to-double-talk-state transition threshold is a lower value than a double-to-single-talk-state transition threshold. This results in a hysteresis so that the algorithm doesn't continuously set and clear as it performs the steps of method 400, and other related methods such as those described elsewhere herein. Such a condition of setting and clearing is sometimes referred to as 'thrash' and is undesirable.

Figure 5:
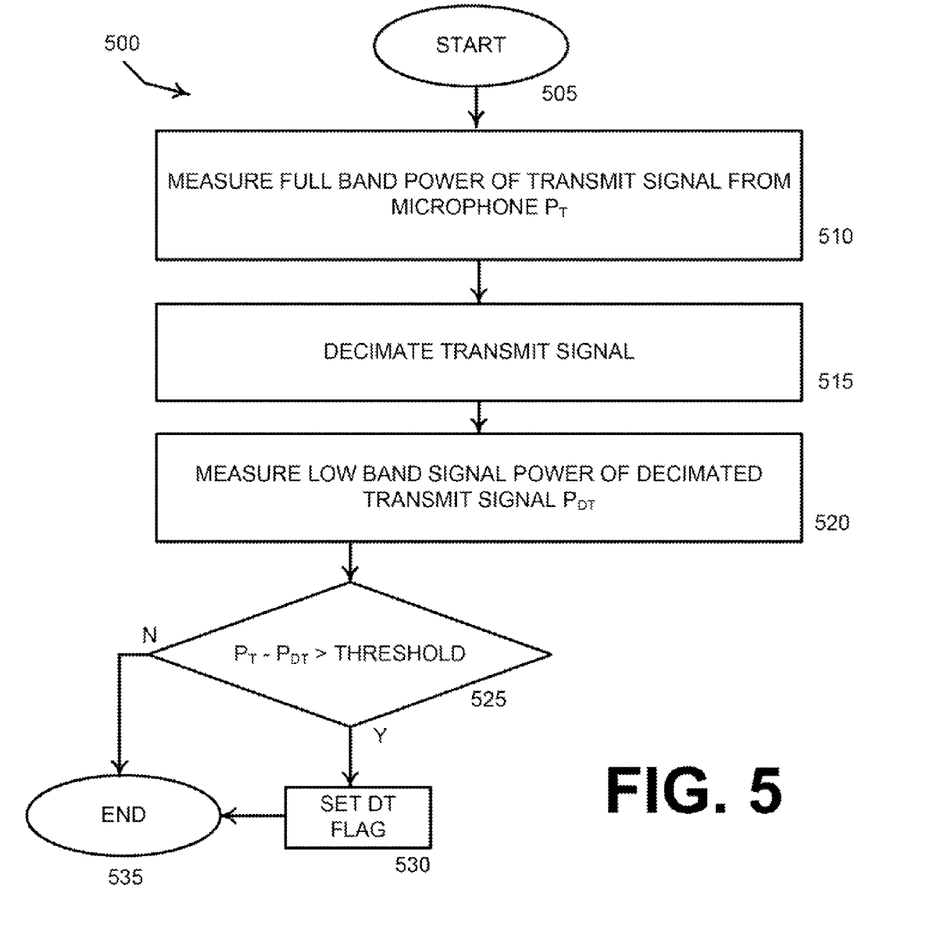
FIG. 5 illustrates a flow diagram of a method for determining the presence of double talk.

Turning now to FIG. 5, the figure illustrates a flow diagram of a method 500 for detecting double talk and determining whether to set a double talk flag for use with an adaptive echo cancelling filter. Narrow band telephony voice signals typically occupy a bandwidth of 200 Hz-3200 Hz and are typically sampled at 8 kHz. However, in telematics systems that provide voice recognition functionality, sampling the microphone signal at a sampling rate of 16 kHz improves the accuracy of the recognition system. Since typically a single codec chip provides both analog-to-digital conversion (ADC) and digital-to-analog conversion (DAC), the far-end signal 8 is also sampled (upsampling may be used) at 16 kHz. This is depicted in the block diagram shown in FIG. 1, which shows 16 kHz DAC 44 and 16 kHz ADC 16. The higher sampling rate inputs 14 to acoustic echo canceller 4 present two main disadvantages for the acoustic echo canceller:

Increased processing complexity

Reduced algorithm performance due to the higher spectral dynamic range

These problems can be overcome by including sample rate conversion at the input and output of the echo canceller and operating the echo canceller at 8 kHz sample rate. However, there is also a potential advantage that can be obtained due to the higher sample rate. Since in most cases receive signal from the narrowband cellular network is telephony bandlimited, the echo signal energy exists only below 4 kHz and is expected to be negligible energy in the 4 kHz-8 kHz band. In contrast, the near end speech signal in microphone signal 12 can have significant energy in the 4 kHz-8 kHz band for certain types of sounds (e.g., consonants). Further, vehicular noise tends to have a predominantly low pass spectrum and has negligible energy in the 4 kHz-8 kHz band.

Exploiting these properties of near and far end signals aids and improves the accuracy of detection of double talk condition. Since the detection of double talk during low level near end signals such as consonants can be problematic, using signal information from microphone transmit signal 12 and decimated transmit signal 14 improves the performance of the AEC 4 by improving the accuracy of double talk detection during double talk conditions. The technique can be summarized by the following steps:

1. Before the transmit signal 12 is decimated to a 8 kHz sample rate, compute power block 40 of the AEC algorithm 4 measures full band power of transmit signal 12 in the 0-8 kHz band.
2. After the 2× decimator 18 decimates, or downconverts or downsamples, transmit signal 12 to an 8 kHz sample rate, compute power block 42 measures the low band power of decimated transmit signal 14 in the 0-4 kHz band.
3. Both power measurements are provided to double talk detector 34 as inputs. Double talk detector 34 evaluates the two power values and determines the difference between the full band and low band powers. DTD module 34 then compares the difference between the two powers to a predetermined threshold (1 dB typical). If the difference exceeds the threshold, this indicates that the near end talker is possibly active and the double talk flag is set to indicate a double talk condition. Otherwise, the state of the double talk flag is not modified—if the flag is currently set it is not then cleared when the difference does not exceed the threshold because near end vowel sounds do not have significant energy in the 4 kHz-8 kHz band and thus double talk could be present even if the difference in full and low band power does not exceed the threshold.

Returning to the description of FIG. 5, which illustrates setting a double talk flag is the power difference exceeds the predetermined threshold. At step 510, method 500 running in AEC 4 of FIGS. 1 and 2 measures full band power at a first sample rate. Full band is the band over which the sample rate supports. If the sample rate is 16 kHz, as shown in FIG. 1, full band is half of the sample rate, or 8 kHz. At step 515, the AEC algorithm converts the transmit signal into a downsampled, or decimated, transmit signal so that it has a second sampling rate and signal power over a second bandwidth. The second sampling rate and bandwidth are lower than the first sampling rate and bandwidth. For example, the 2× decimator 18 shown in FIGS. 1 and 2 would convert the transmit signal 12 from a digital signal having a first sampling rate of 16 kHz and a first bandwidth bandwidth of 0-8 kHz, to a decimated transmit signal having a second sampling rate of 8 kHz and a second bandwidth of 0-4 kHz.

Method 500 measures the power of decimated transmit signal 14 at step 520. Decimated transmit signal 14 has second sampling rate of 8 kHz and second bandwidth of 0-4 KHz.

At step 525, the algorithm compares the difference between the measured power level of the transmit signal $P_T$ 12 and the power level of the decimated transmit signal 14 $P_{DT}$ to a predetermined threshold.

If the difference exceeds the threshold as determined at step 525, method 500 follows the 'Y' path to step 530 and sets a double talk detection flag and then ends at step 535. If, however, the difference does not exceed the threshold, the method follows the 'N' path and ends at step 535. Method 500 does not clear the double talk flag if it was already set because the difference in power levels $P_T$-$P_{DT}$ may not exceed the threshold, even if double talk is present, such as when the near talker does not utter any consonants during a sampling period. In an aspect, the predetermine threshold is 1 dB.

In another aspect, an echo path change detector ("EPCD") detects sudden changes in echo path, due to, for example, significant movement of the driver or passengers, changes in seat positions etc. EPCD helps reduce the negative effects of these conditions, which reduce the cross correlation between receive and transmit signals (as computed by the DTD), and lead to erroneous DT detections. This in turn freezes the adaptation of echo model leading to poor AEC performance. The EPCD is based on the assumption that AEC will adapt well for slow and gradual echo path changes in echo path and only the abrupt and the drastic changes need to be detected and given special treatment.

In an aspect, an EPCD computes the ratio between estimated residual echo energy and estimated echo energy obtained from the unbiased DTD block. While the echo path is changing the ratio calculated above rises suddenly due to the mismatch of the real echo path and estimated one. This ratio will be an indication of echo path change. The decision of echo path change is given by comparing the ratio to a fixed threshold.

Once echo path change is detected the adaptive filter step size and product of the FFT vectors of the receive signal and the echo canceller output signal will be initialized. The EPCD will also allow a short period of time (<1.5 sec.) without claiming DT. This will ensure the reconvergence of the adaptive filter. During that period of time the nonlinear processor (NLP block) will help the adaptive filter to suppress the residual echo. In simulation the EPCD can detect the abrupt echo path change very accurately and detection delay is very limited under noise interference.

Figure 3:
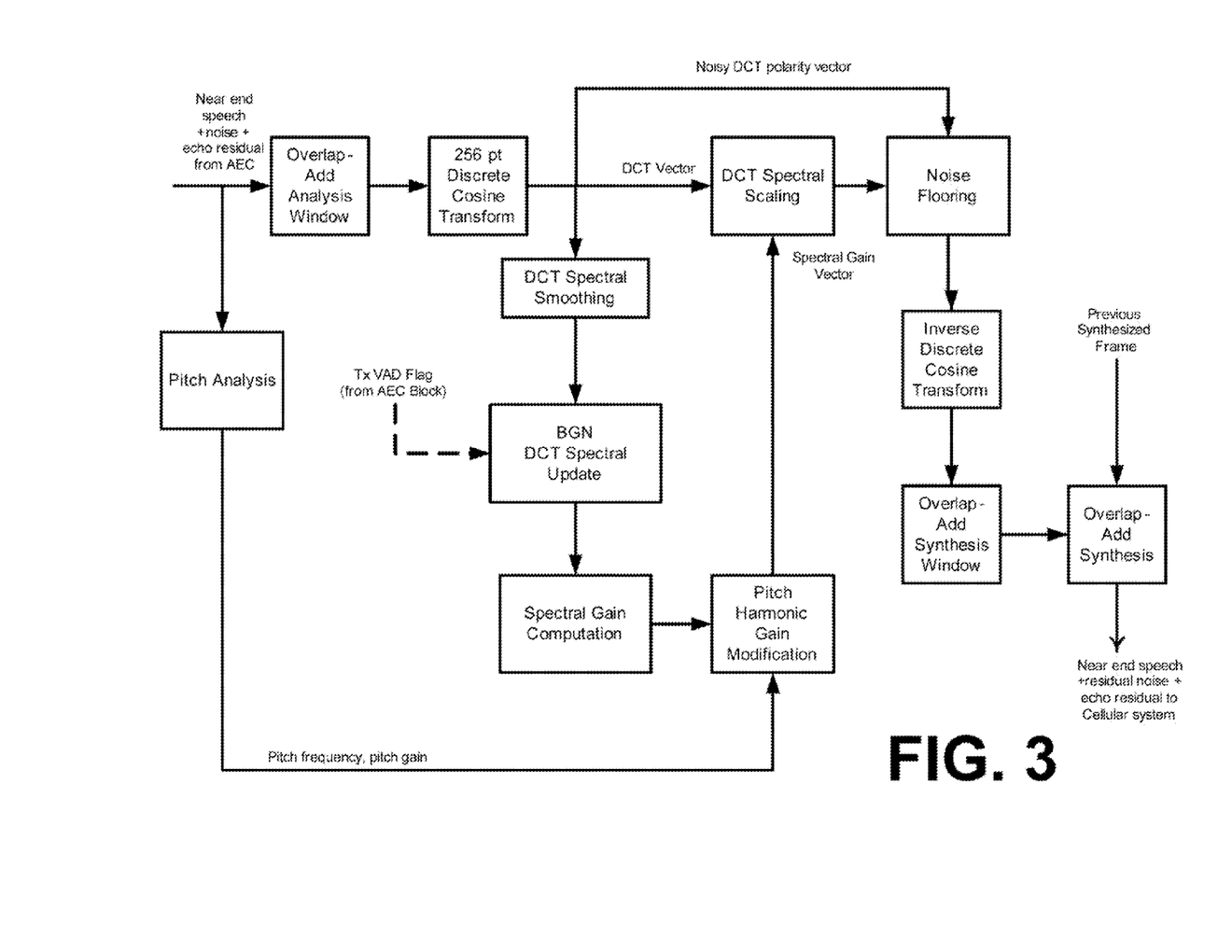
FIG. 3 illustrates a block diagram of a noise reducing system.

A noise reduction ("NR") aspect is based on a spectral enhancement algorithm. This algorithm has been adapted for use in a vehicle environment to work with significantly higher noise levels often encountered in telematics applications. FIG. 3 illustrates a block diagram of the noise reduction aspect.

Instead of operating in the discrete Fourier transform ("DFT"), using discrete cosine transforms ("DCT") provides a better transform for speech signals, since it more closely approximates the ideal Karhunen-Loeve transform. In particular, the noise and speech spectra can be better discriminated in the DCT domain, leading to better performance of the NR algorithm. However, conversion of NR algorithm from DFT to DCT domain processing is not straightforward. Since DFT is a complex valued transform, the DFT of the signal spectrum can be decomposed into magnitude and phase components. Typically, the DFT magnitude is modified by the spectral gain function and subsequently combined with the original phase and inverse DFT is used to recover the noise reduced signal. However, DCT is a real valued transform and provides no magnitude/phase decomposition. Modifications were developed to circumvent this problem as well as other issues that are specific to performing noise reduction in the DCT domain.

In the DCT domain, the input signal is typically processed in blocks of 256 samples with a 50% (128 samples) overlap. Each block is bounded, or windowed, by an analysis window and transformed to DCT domain. The DCT vector is then subjected to a spectral scaling operation that scales each DCT coefficient with a scale factor (limited to range 0-1), directly proportional to the estimated SNR at the frequency of the DCT coefficient. This has the effect of attenuating spectral regions dominated noise and preserving DCT in spectral regions dominated by the desired speech signal. The resulting DCT vector is subjected to a noise flooring operation to prevent musical noise artifacts. It is then inverse transformed to time domain and processed through an overlap add synthesis process to produce noise reduced speech. The following summarizes the novel aspects that have been developed to perform noise reduction in the DCT domain.

A traditional voice activity detection ("VAD") based algorithm has a fixed time constant which can reduce a certain amount of stationary noise but lose the quick response to fast change in background noise spectrum. In an aspect, estimation of a background noise spectrum is based on a SNR dependent time recursive averaging algorithm. In a SNR dependent based background noise estimation algorithm each frequency bin has its corresponding time constants. The time constants are calculated based on the a posteriori SNR. This algorithm allows the further suppression of the background noise. It also performs well in nonstationary noise environment. To prevent the speech leakage (overestimation) a modification at detected harmonics is also performed. The algorithm can be described as following:
1. The a posteriori SNR is computed based on the incoming transmit signal and previous estimated noise spectrum average by 10 frames in DCT domain. Each frequency bin has its corresponding SNR.
2. A sigmoid function (between 0-1) is applied to the a posteriori. SNR at each frequency bin to generate the corresponding time constants.
3. Update the estimation of background noise spectrum by the time constants calculated above.
4. The SNR dependent noise spectrum estimation also exploits the pitch gain and estimated pitch calculated in the block of pitch analysis to modify the time constants at each harmonics to prevent speech leakage.

The SNR dependent background noise estimation can further suppress the background noise to a lower noise floor without musical noise and deterioration in intelligibility.

The NR algorithm computes a spectral gain as a function of frequency to attenuate spectral regions of the noisy speech spectrum that are dominated by noise energy. To prevent audible artifacts, it is important that the spectral gain function evolve smoothly both as a function of time as well as frequency. In order to accomplish this, a spectral smoothing operation is applied as summarized by the following steps:
1. The magnitude squared DCT (DCT power spectrum) of the noisy speech input is computed.
2. A frequency domain window function is applied, centered at each frequency bin. The typical window is a rectangular window with a width in the range 3-9 points.
3. The DCT power spectral coefficient in each frequency bin is replaced by the maximum value within the window, constructing a DCT power spectrum envelope, which is subsequently used in spectral gain computation.

In each frame, the DCT power spectrum of the noisy speech and the background noise spectral estimate are used to determine a frequency domain SNR function. A spectral gain function is computed by applying a non-linear function to the SNR function. The spectral gain function attenuates spectral component at each frequency in inverse proportion to the estimated SNR at that frequency. The steps are:
1. The noise spectral estimate is subtracted from the smoothed DCT power spectrum and the result is averaged in the time domain to produce a slowly evolving noise reduced spectral estimate for speech. Typical time constant is 1.5 sec.
2. A SNR estimate vector xi is computed that provides an estimate of the apriori SNR at each frequency of the DCT.
3. Two frequency dependent gain vectors are computed (k is the DCT frequency index):
   a. $G1(k)=1-1/(1+xi(k))$
   b. $G2(k)=1-0.5*sqrt(NoiseSpectralEstimate(k)/DCT\ power\ Spectrum(k))$
   Both these gains are forced to be non-negative.
4. The final spectral gain function is computed via
   a. $G(k)=sqrt(G1)*G2$.

One of the short comings of existing noise reduction techniques is that the as the degree of noise reduction increases, the speech distortion also increases, especially at low SNRs. This is primarily due to the excessive attenuation (i.e., low values of spectral gain function) of pitch harmonic components of speech during periodic segments. This operation is summarized by the following steps:
1. A pitch estimation algorithm is used to estimate the fundamental pitch frequency and a degree of voicing (pitch gain).
2. If the pitch gain is below a threshold (0.4 typical), indicating absence of significant harmonic structure, the spectral gain function is not modified.
3. If the pitch gain exceeds the threshold, indicating significant harmonic structure, the spectral gain for the DCT coefficients in the vicinity of pitch harmonics is increased. Each harmonic is located on the DCT coefficient axis. The set of 3 DCT coefficients centered at each pitch harmonic are enhanced in amplitude by increasing the spectral gain for those coefficients. The degree of increase is proportional to the degree of voicing.

After spectral gain and harmonic enhancement, the input DCT vector is multiplied by the spectral gain function, resulting in noise reduction. Subsequently, DCT coefficients below a configurable "noise floor" are set to the level of the noise floor. The magnitude DCT spectrum of the noise reduced signal is combined with the sign of the DCT of the noisy signal to compute the time domain samples. The steps are:

1. Multiply the input DCT with the spectral gain vector to produce noise reduced DCT.
2. DCT coefficients with absolute values lower than a noise floor threshold are
   a. Set to a magnitude equal to the noise floor threshold, and
   b. Set to a polarity (sign) equal to the polarity of the noise speech DCT at the same frequency
3. The resulting DCT is subjected to a spectral smoothing operation in the high frequency band (2000 Hz-4000 Hz). This smoothing is applied only for inactive frames (i.e., TX VAD indicates that no transmit voice signal is present) and for aperiodic frames, as indicated by a low pitch gain (<0.35). The goal is to reduce spectral dynamics for background noise after noise suppression, to prevent audible artifacts.
4. The resulting DCT is inverse transformed to time domain, windowed using a overlap—add synthesis window and summed with the samples from the previous frame to produce a frame of noise reduced speech samples.

Acronyms:
ECNR: Echo cancellation and Noise reduction
AEC: Acoustic Echo Cancellation
NR: Noise reduction
VAD: Voice activity detector
DTD: Double talk detector
TX: Transmit
RX: Receive
DCT: Discrete cosine transform
DFT: Discrete Fourier transform These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for performing adaptive signal conditioning, comprising:
   determining an initial value for a step size used in an adaptive filter algorithm based on:
   a background noise signal power level relative to a power level of a received signal; and
   a power level of an echo estimate relative to an output of an echo canceller; and
   adjusting the step size value based on the detection of large fast fourier transform dues at one, or more, disturbing-signal frequencies:
   wherein the method step of adjusting the step size value based on the detection of large fast courier transform values at one, or more, disturbing-signal frequencies includes:
   processing a predetermined number of signal samples acquired during a short sampling period to compute a receive fast fowler transform vector;
   processing the corresponding estimated echo samples to compute a reduced echo fast fourier transform vector;
   computing the product of the receive fast fourier transform vector and the reduced fast fourier transform vector to obtain a fast fourier transform product vector;
   averaging multiple fourier transform product vectors from corresponding multiple sampling periods over a long sampling period into a average fourier transform product vector;
   updating the average fourier transform product vector with a fourier transform product vector processed during a current iteration of the short sampling period;
   determining a plurality of deviations, each of the plurality of deviations determined between the fourier transform product vector determined during the most recent short sampling period and the most recently updated average fourier transform product vector for one of a predetermined frequencies;
   determining an average of a plurality of the deviations for which the fourier transform product vector exceeds the most recently updated average fourier transform product vector; and
   reducing the step-size if the average of the plurality of deviations exceeds a predetermined threshold.

2. The method of claim 1, further comprising:
   determining a peak deviation for the plurality of deviations; and
   reducing the step size in proportion to the determined peak deviation if the peak deviation exceeds a predetermined threshold.

3. A method for performing adaptive signal conditioning, comprising:
   determining an initial value for a step size used in an adaptive filter algorithm based on:
   a background noise signal power level relative to a power level of a received signal; and
   a power level of an echo estimate relative to an output of an echo canceller; and
   adjusting the step size value based on the detection of large fast fourier transform values at one or more, disturbing-signal frequencies:
   determining a normalized cross correlation vector between a receive signal received from a communications network and a transmit signal composed of a near-end voice signal, a background noise signal, and an echo signal, which is a delayed version of the receive signal;
   determining a transmit signal energy value corresponding to the energy contained in the transmit signal;
   determining an estimated echo signal energy by calculating the inner product of the normalized cross correlation vector and a frequency response vector of the estimated echo path model;
   determining a double talk presence indication value by calculating a ratio between the estimated echo energy and transmit signal energy;
   determining an adaptive threshold using a ratio between the echo signal's energy and the energy in the background noise signal;
   comparing the double talk presence indication value to the predetermined adaptive threshold;
   setting a double talk flag if the double talk presence indication value exceeds the predetermined adaptive threshold;
   comparing the difference between energy of the transmit signal and energy of a noise and echo composite signal; and
   setting the double talk flag when the result of the comparison of the difference between energy of the transmit signal and energy of a noise and echo composite signal exceeds a predetermined level.

4. The method of claim 3 wherein the double talk flag is set if the difference between energy of the transmit signal and energy of a noise and echo composite signal exceeds 10 dB.

5. The method of claim 3 further comprising:
   determining an estimated residual echo signal energy by calculating the energy of the difference between the transmit signal and the estimated echo signal when an energy level of the near-end voice signal is zero;

adjusting the estimated echo signal energy based on the estimated residual echo signal energy to result in an updated echo signal energy;

comparing the updated echo energy to background noise signal ratio to a single-to-double-talk-state transition threshold;

setting the double talk flag, if the updated echo energy to background noise signal ratio exceeds the single-to-double-talk-state transition threshold; and wherein the single-to-double-talk-state transition threshold is a lower value than a double-to-single-talk-state transition threshold.

6. A method for performing double talk detection of a transmit signal having a first sampling rate and a first bandwidth, comprising:

measuring power of the transmit signal over the first bandwidth at the first sampling rate;

converting the transmit signal into a downsampled transmit signal so that it has a second sampling rate lower than the first sampling rate and so that it has signal power over a second bandwidth that has a lower bandwidth than the first bandwidth;

measuring power of the downsampled transmit signal having the second sampling rate over the second bandwidth;

comparing the difference between the transmit signal and the downsampled transmit signal to a predetermined threshold; and setting a double talk flag indicative of a double talk condition if the difference between the transmit signal and the downsampled transmit signal exceeds the predetermined threshold.

7. The method of claim 6 wherein the predetermined threshold is 1 dB.

8. The method of claim 6 wherein the first bandwidth is 0-8 kHz and the second bandwidth is 0-4 kHz, and wherein the first sample rate is 16 kHz and the second sample rate is 8 kHz.

9. The method of claim 6 wherein the method of converting the transmit signal into an downsampled signal is decimation.

* * * * *